A. AIRD & W. RANDEL.
Cam-Slides for Sewing-Machines.

No. 148,640. Patented March 17, 1874.

WITNESSES.
E. Wolff
C. Sedgwick

INVENTOR.
A. Aird
W. Randel
BY
ATTORNEYS.

UNITED STATES PATENT OFFICE.

ANDREW AIRD AND WILLIAM RANDEL, OF TROY, NEW YORK.

IMPROVEMENT IN CAM-SLIDES FOR SEWING-MACHINES.

Specification forming part of Letters Patent No. 148,640, dated March 17, 1874; application filed February 28, 1874.

*To all whom it may concern:*

Be it known that we, ANDREW AIRD and WILLIAM RANDEL, of Troy, Rensselaer county and State of New York, have invented a new and Improved Cam-Slide for Sewing-Machines, of which the following is a specification:

Our invention consists of a block of steel or other material on the end of the needle-arm which works in the cam-groove, so constructed as to slide in the groove as a substitute for the roller commonly used, said block being divided into two separate pieces, whose exterior faces are shaped so as to allow them to slide freely along the varying angles of the cam, and the interior faces made to permit an independent oscillating motion of each part on the stud of the arm. Our invention also consists of a spring between the blocks to keep them apart to take up the slack that may occur by wear, and cause them to fill the groove at all times.

Figure 1:
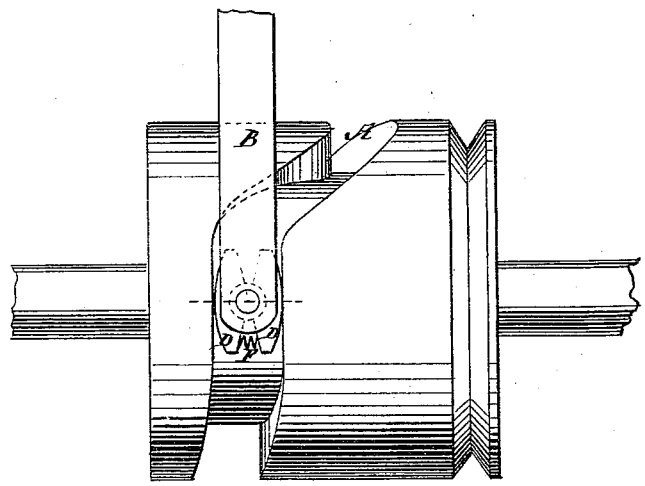
Figure 2:
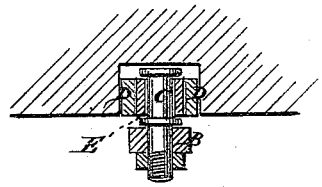

Figure 1 is a side elevation of a cam, middle arm, stud, and sliding block; and Fig. 2 is a section of Fig. 1 on the line *x x*.

Similar letters of reference indicate corresponding parts.

A is the cam-groove; B, the needle-arm; C, the stud of the arm, working in the groove; D, the slide; E, a collar on the stud to which the slide is fitted; and F, a spring to press the two parts of the block against the walls of the groove to take up the slack. The two parts of the slide are fitted to the collar E by a semicircular cavity in the interior face, and from the cavity to the ends they are beveled, as shown, so as to oscillate toward and from each other, and the exterior faces are made oval to run smoothly along the curvatures of the walls of the groove. The spring is placed between them at one side of the stud to press them outward against the walls, and a spring may be used on the other side, if desired.

The advantages gained by this arrangement are, first, less friction than the roller arrangement; second, increased surface exposed to wear, and consequently less wear; third, the slack caused by the wear is automatically taken up by the spring, causing the motion to continue the same as if no wear occurred; fourth, greater smoothness in the motion, the elasticity of the spring preventing the pounding and noise common to the roller; fifth, it protects the cam from injury by the blows to which it is subject by the roller striking on the acute angles; and sixth, the machine can be run at higher speed.

Having thus described our invention, we claim as new and desire to secure by Letters Patent—

1. The combination of a block of two parts, D, capable of oscillation independent of each other, with the stud C and cam, substantially as specified.

2. The combination of a spring with said block stud and cam, substantially as specified.

WILLIAM RANDEL.
ANDREW AIRD.

Witnesses:
JESSE A. RANDEL,
WM. GEDDIS.